United States Patent [19]

Guth

[11] Patent Number: 5,399,834
[45] Date of Patent: Mar. 21, 1995

[54] METHOD AND DEVICE FOR BUTT WELDING METAL SHEETS BY MEANS OF A LASER BEAM

[75] Inventor: Jérôme Guth, Dunkerque, France
[73] Assignee: Sollac, Puteaux, France
[21] Appl. No.: 94,438
[22] Filed: Jul. 21, 1993

[30] Foreign Application Priority Data

Aug. 4, 1992 [FR] France ................. 92 09669

[51] Int. Cl.⁶ ............................................. B23K 26/00
[52] U.S. Cl. ......................... 219/121.63; 219/121.64; 219/121.82
[58] Field of Search ...................... 219/121.63, 121.64, 219/121.82

[56] References Cited

U.S. PATENT DOCUMENTS 4,912,295  3/1990  Arimochi et al. .................... 219/104
5,276,304  1/1994  Sauvage et al. ................. 219/121.63

Primary Examiner—Mark H. Paschall
Attorney, Agent, or Firm—Oblon, Spivak, McClelland, Maier & Neustadt

[57] ABSTRACT

The subject of the present invention is a method for butt welding metal sheets (1, 2) by means of a laser beam, characterized in that a lateral pressure F directed towards the joint plane (3) of the metal sheets (1, 2) is exerted on the metal sheets (1, 2) to be welded in order that the contact pressure between the said metal sheets, at any point in the region of the joint plane (3), lies between 0.05 times the elastic limit of the metal sheet (1 or 2) having the lower elastic limit and the buckling pressure of the metal sheet (1 or 2) having the minimal buckling pressure and a welded seam is produced in the region of the joint plane (3) by local melting of the said metal sheets (1, 2) by means of the laser beam.

The subject of the invention is also a welding device for implementing this method.

6 Claims, 1 Drawing Sheet

METHOD AND DEVICE FOR BUTT WELDING METAL SHEETS BY MEANS OF A LASER BEAM

The subject of the present invention is a method and a device for butt welding metal sheets by means of a laser beam.

The butt welding of metal sheets by means of a laser beam demands very stringent requirements of precision, shape and position of the metal sheets to be welded.

In fact, the quality of the welded seam depends to a great extent on the precision in the position of the metal sheets and in the quality of the contact in the region of the joint plane between the said metal sheets.

If the quality of the contact in the region of the joint plane between the metal sheets to be welded is incorrect, that is to say the clearance between the metal sheets to be welded is too great, it may turn out that the joint plane is not continuous and has holes.

Moreover, when the clearance between the metal sheets in the region of the joint plane is locally too great, it turns out that the welded seam may, in certain zones, collapse.

Such a collapse of the joint plane is tolerated if it does not exceed certain limits.

Thus, for example the standards defined by motor-vehicle manufacturers require, for metal sheets whose thickness is less than 1 mm, the total value of the collapse of the welded seam, that is to say the accumulated value of the collapse in the upper part and lower part of the metal sheets, may not exceed 20% of the thickness of the metal sheet of smaller thickness.

Likewise, for metal sheets of thickness greater than 1 mm, the total value of the collapse of the welded seam must not exceed 10% of the thickness of the metal sheet of lower thickness.

In order to limit these risks of a non-continuous seam or a seam having too great a collapse, the quality of the shearing of the metal sheets has been improved up to now so as to limit the undulations of the cutting edges and to provide a better mutual contact of the metal sheets in order to control better the clearance between the said metal sheets.

However, in order to obtain such a result, it is necessary to invest in very precise, expensive shears or to use double shears making it possible to cut, with the same blade, simultaneously the two sheet-metal blanks to be butt-joined.

Another solution consists in preparing the sheet-metal blanks to be welded by means of a laser beam.

The object of the present invention is to provide a method and a device for butt welding metal sheets by means of a laser beam, making it possible to provide a minimum clearance in the region of the joint plane of the metal sheets so as to obtain a good quality of the welded seam, even when the metal sheets are sheared separately with the aid of a so-called standard shear.

The subject of the invention is therefore a method for butt welding metal sheets by means of a laser beam, characterised in that a lateral pressure directed towards the joint plane of the metal sheets is exerted on the metal sheets to be welded in order that the contact pressure between the said metal sheets, at any point in the region of the joint plane, lies between 0.05 times the elastic limit of the metal sheet having the lower elastic limit and the buckling pressure of the metal sheet having the minimal buckling pressure and a welded seam is produced in the region of the joint plane by local melting of the said metal sheets by means of the laser beam.

According to other characteristics of the invention:
the contact pressure between the said metal sheets can vary depending on the point where it is exerted in relation to the ends of the joint plane of the said metal sheets,
the pressure between the metal sheets has a greater value at the points of the joint plane having a large clearance than a value at the points for which the clearance is a minimum or is zero,
the contact pressure between the metal sheets has a minimum value in the vicinity of the ends of the joint plane of the said metal sheets and a maximum value in the vicinity of the centre of the said joint plane,
the minimum pressure is equal to 0.05 times the elastic limit of the metal sheet having the lower elastic limit and the maximum pressure is equal to the buckling pressure of the metal sheet having the minimal buckling pressure.

The subject of the present invention is also a device for butt welding metal sheets by means of a laser beam for implementing the method mentioned herein above, characterised in that it includes means for applying lateral pressure directed towards the joint plane of the metal sheets to be welded.

The characteristics and advantages of the present invention will appear in the course of the description which follows, given solely by way of example, with reference to the attached drawings, in which.

Figure 1:
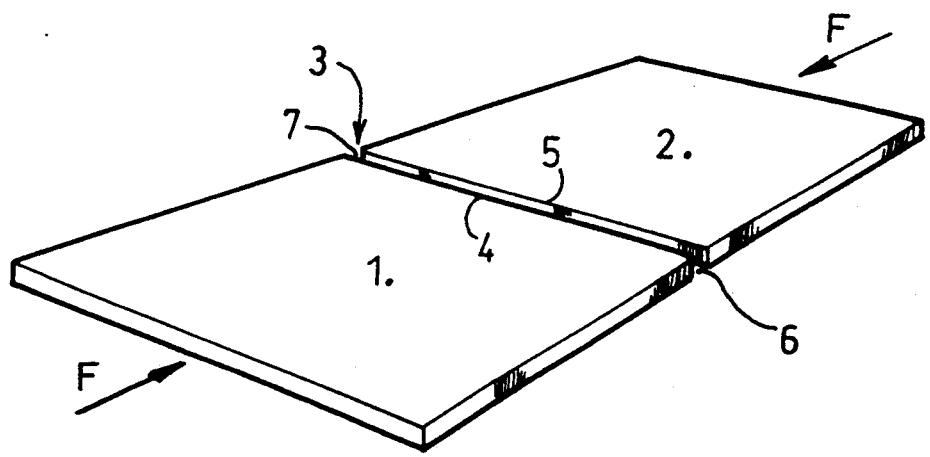
FIG. 1 is a diagram perspective view of two metal sheets to be butt welded.

The method according to the present invention consists in welding at least two metal sheets 1 and 2 end to end by means of a laser beam, which is not shown.

The method consists in exerting a lateral pressure F directed towards the joint plane 3 of the said metal sheets on the metal sheets 1 and 2 to be welded in such a way that the contact pressure P which is exerted in the region of the said joint plane 3, on the lateral faces 4 and 5 in contact, lies between 0.05 $R_e$ and $P_f$, $R_e$ being the elastic limit of the metal sheet 1 or 2 having the lower elastic limit and $P_f$ being the limiting buckling pressure of the metal sheet 1 or 2 having the minimal limiting buckling pressure.

In fact, if the lateral pressure F exerted on the metal sheets 1 and 2 is too low so that the contact pressure P reaches the limiting value of 0.05 $R_e$, the contact between the metal sheets 1 and 2 in the region of the joint plane 3 is not of quality sufficient to obtain, after welding, a satisfactory welded seam.

Likewise, if the force F is too great, leading to a contact pressure P between the two metal sheets 1 and 2 greater than the limiting buckling pressure of the metal sheet 1 or 2 having the lower limiting buckling pressure, buckling of the metal sheets occurs and, after welding, the welded seam is displaced, or even impossible to produce.

The limiting buckling pressure $P_f$ of the metal sheets 1 and 2 depends on the mechanical characteristics of the said metal sheets and on the free length located outside the clamping jaws.

For example, in the case of the welding of two 0.8 mm-thick metal sheets made of low-carbon mild steel for a use in motor vehicles, having an elastic limit equal to 170 MPa, the contact pressure to be exerted in the region of the joint plane 3 must lie within the following interval:

$$8.5 MPa < P < 15 MPa.$$

Advantageously, the welding method according to the invention consists in exerting, on the metal sheets 1 and 2, a lateral pressure F directed towards the joint plane 3 of the said metal sheets in such a way that the contact pressure P between the metal sheets 1 and 2, in the region of the joint plane 3, can vary depending on the point where it is exerted with respect to the ends 6 and 7 of the said joint plane 3.

Figure 2:
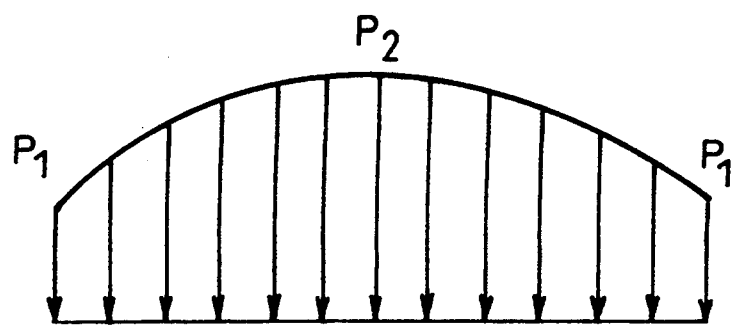
FIG. 2 is a diagram showing an example of the distribution of the contact pressure between the metal sheets in the region of the joint plane, according to the method of the invention.

The minimum value $P_1$ of the pressure P is exerted in the vicinity of the ends 6 and 7 of the joint plane 3 and the maximum value $P_2$ is exerted in the central zone of this joint plane 3 (FIG. 2).

In the limiting case of the distribution of the contact pressures P in the region of the joint plane 3, the value of the minimum pressure $P_1$ being exerted in the vicinity of the ends 6 and 7 of this joint plane is equal to 0.05 $R_e$ and the value of the maximum pressure $P_2$ in the vicinity of the centre of the joint plane 3 is equal to $P_f$.

This variable distribution of the contact pressures between the metal sheets 1 and 2 in the region of the joint plane 3 enables the risk of these metal sheets buckling to be minimised, since this buckling is often initiated via the edges of the metal sheets on account of the distortions and possible damage which the said metal sheets undergo while they are being stored and they are being transported.

In addition, this variable distribution of the contact pressures makes it possible to provide a quality of the contact between the metal sheets 1 and 2 which is more uniform over the entire length of the joint plane 3.

In fact, the operation of shearing the metal sheets induces stress relief in the region of the centre of the sheared metal sheets.

This stress relief may lead to a shrinkage of the metal sheet in this region, therefore at the centre of the sheared metal sheet and thus significant residual clearances at this location.

In the case where the welding installation includes a device for monitoring the adjunction, making it possible to locate, in the region of the joint plane 3, the points for which the clearance is too great, the present invention makes it possible to exert a pressure P between the metal sheets 1, 2 with a value $P_2$ which is greater at the points of the joint plane having a large clearance than a value $P_1$ at the points for which the clearance is a minimum or is zero.

The present invention also relates to a device for butt welding metal sheets by means of a laser beam.

This device includes means for applying lateral pressure directed towards the joint plane 3 of the metal sheets 1 and 2 to be welded.

These means are constituted by at least three members, which may or may not be separate, enabling a minimum contact pressure $P_1$ to be exerted in the vicinity the ends 6 and 7 of the joint plane 3 and a maximum contact pressure $P_2$ in the vicinity of the centre of the said joint plane 3.

Figure 3:
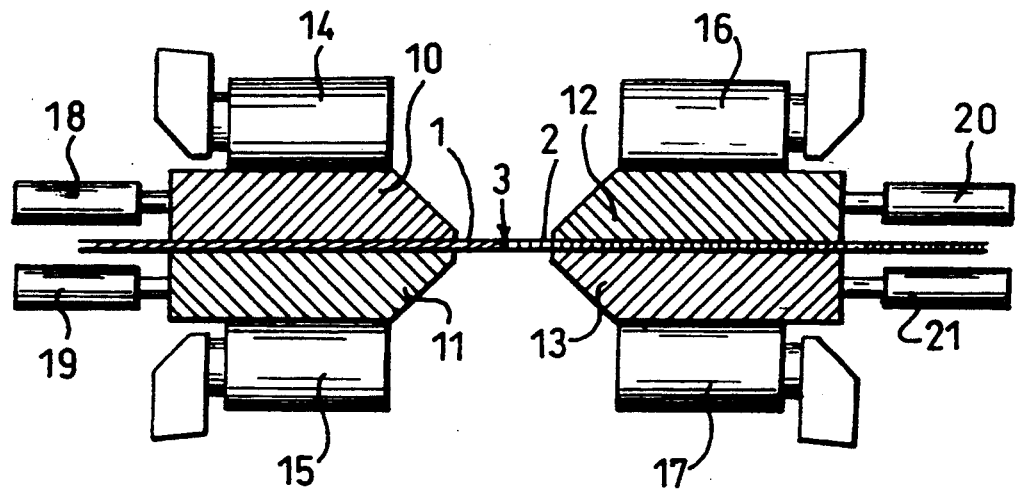
FIG. 3 is a diagrammatic view of an embodiment of a welding device according to the present invention.

In the embodiment shown in FIG. 3, each metal sheet 1 and 2 to be welded is held by means of pads 10, 11, 12 and 13 in contact with the upper and lower face of each metal sheet 1 and 2, respectively 10 and 11 for the upper and lower faces of the metal sheet 1 and 12 and 13 for the upper and lower faces of the metal sheet 2.

Vertical pressure on the pads 10, 11, 12 and 13 is applied respectively by bearing rollers 14, 15, 16 and 17.

The means for applying lateral pressure on the metal sheets 1 and 2 are constituted, for example, by cylinders, respectively 18, 19, 20 and 21 rigidly connected respectively to the pads 10, 11, 12 and 13.

In general, the welding installation consists of series of pads 10, 11, 12 and 13, each cylinder 18, 19, 20 and 21 moving with the pads 10, 11, 12 and 13.

Each metal sheet 1 or 2 is held by at least three sets of pads during its movement towards the laser beam, not shown, two sets of end pads exerting, by means of their cylinders, a force calculated to obtain a minimum contact pressure $P_1$ in the vicinity of the ends of the joint plane 3 and a central set of pads exerting, by means of its cylinders, a force calculated to obtain a maximum contact pressure $P_2$ in the vicinity of the centre of the said joint plane 3.

The method and the device for butt welding metal sheets by means of a laser beam according to the present invention makes it possible to provide a minimum clearance between the metal sheets to be welded end to end and to prevent the opening of the seam after the welding of these metal sheets.

I claim:

1. Method for butt welding metal sheets (1, 2) by means of a laser beam, characterised in that a lateral pressure F directed towards the joint plane (3) of the metal sheets (1, 2) is exerted on the metal sheets (1, 2) to be welded in order that the contact pressure P between the said metal sheets, at any point in the region of the joint plane (3), lies between 0.05 times the elastic limit $R_e$ of the metal sheet (1 or 2) having the lower elastic limit and the buckling pressure $P_f$ of the metal sheet (1 or 2) having the minimal buckling pressure and a welded seam is produced in the region of the joint plane (3) by local melting of the said metal sheets (1, 2) by means of the laser beam.

2. Welding method according to claim 1, characterised in that the contact pressure P between the said metal sheets (1, 2) can vary depending on the point where it is exerted in relation to the ends (6, 7) of the joint plane (3) of the said metal sheets.

3. Method according to one of claims 1 and 2, characterised in that the pressure P between the metal sheets (1, 2) has a greater value $P_2$ at the points of the joint plane (3) having a large clearance than a value $P_1$ at the points for which the clearance is a minimum or is zero.

4. Welding method according to one of claims 1 and 2, characterised in that the contact pressure P between the metal sheets (1, 2) has a minimum value $P_1$ in the vicinity of the ends (6, 7) of the joint plane (3) of the said metal sheets and a maximum value ($P_2$) in the vicinity of the centre of the said joint plane (3).

5. Welding method according to claim 4, characterised in that the minimum pressure ($P_1$) is equal to 0.05 times the elastic limit $R_e$ of the metal sheet (1 or 2) having the lower elastic limit and the maximum pressure $P_2$ is equal to the buckling pressure $P_1$ of the metal sheet (1 or 2) having the minimal buckling pressure.

6. Device for butt welding metal sheets (1, 2) by means of a laser beam characterized in that it includes means (18, 19, 20, 21) for applying lateral pressure to the metal sheets (1, 2), this pressure being directed towards the joint plane (3) of the said metal sheets to be welded such that a contact pressure between the metal sheets at any point in the regions of the point plane is in a range defined by a lower limit equal to 0.05 times the elastic limit $R_e$ of the metal sheets and an upper limit equal to the minimum buckling pressure $P_f$ of the metal sheets, wherein a welded seam is produced in the region of the joint plane by local melting of the metal sheets using said laser beam.

* * * * *